(12) United States Patent
Andrzejak et al.

(10) Patent No.: US 11,136,193 B2
(45) Date of Patent: Oct. 5, 2021

(54) OILFIELD WATER STORAGE SYSTEM AND METHOD

(71) Applicants: Timothy Al Andrzejak, Sugar Land, TX (US); Jorge E. Lopez De Cardenas, Sugar Land, TX (US)

(72) Inventors: Timothy Al Andrzejak, Sugar Land, TX (US); Jorge E. Lopez De Cardenas, Sugar Land, TX (US)

( * ) Notice: Subject to any disclaimer, the term of this patent is extended or adjusted under 35 U.S.C. 154(b) by 26 days.

(21) Appl. No.: 16/579,802

(22) Filed: Sep. 23, 2019

(65) Prior Publication Data

US 2020/0095065 A1 Mar. 26, 2020

Related U.S. Application Data

(60) Provisional application No. 62/734,991, filed on Sep. 21, 2018.

(51) Int. Cl.
| | |
|---|---|
| *B65G 5/00* | (2006.01) |
| *E02B 1/00* | (2006.01) |
| *E21B 21/01* | (2006.01) |

(52) U.S. Cl.
CPC .............. *B65G 5/00* (2013.01); *E02B 1/00* (2013.01); *E21B 21/01* (2013.01)

(58) Field of Classification Search
CPC .............. E02B 1/00; E21B 21/01; B65G 5/00
See application file for complete search history.

(56) References Cited

U.S. PATENT DOCUMENTS

| | | | | |
|---|---|---|---|---|
| 4,353,803 A | * | 10/1982 | Dover, Jr. ............. | C02F 1/5236 175/66 |
| 4,382,341 A | * | 5/1983 | Bell ........................ | E21B 21/06 201/19 |

* cited by examiner

*Primary Examiner* — Dany E Akakpo

(57) ABSTRACT

Oilfield water resource systems and methods for managing oilfield water resources are provided herein. In an embodiment, an oilfield water resource system includes a water storage pond and a second holding pond. The water storage pond includes an oilfield water resource to be provided for use in an oilfield operation. The second holding pond includes low value water different from the oilfield water resource in the water storage pond. The second holding pond is configured to influence relative humidity of air above a water surface of the oilfield water resource in the water storage pond.

11 Claims, 3 Drawing Sheets

OILFIELD WATER STORAGE SYSTEM AND METHOD

CROSS-REFERENCE TO RELATED APPLICATIONS

This application claims the benefit of U.S. Provisional Application No. 62/734,991, filed Sep. 21, 2018.

TECHNICAL FIELD

The technical field generally relates to systems and methods for managing oilfield water resources, and more particularly relates to systems and methods for managing water resources stored in open-air water pits to minimize the volume of produced water from oilfield operations.

BACKGROUND

Oilfield sites regularly employ open-air ponds to store water to be used during certain oilfield extraction operations, such as well drilling, stimulation, water injection, and hydraulic fracture. Hydraulic fracturing generally involves pumping large amounts of fluid into a well at high pressures to create hydraulic fractures. The fluid used in hydraulic fracturing is generally a mixture of water (~90%), a granular proppant material (~9.5%), and gellants and other common chemicals (~0.5%). The granular proppant material is deposited within the fractures to hold them open, leaving a high porosity flow path for petroleum extraction.

FIGS. 1 and 2 show the typical structure of open-air water storage ponds employed in oilfields. A given water pond may include a berm 2 that encircles a water resource 1. Many times, the water pond may be deeper than ground level 3. Additionally, the bottom of the pond and internal sides of the berm 2 are typically covered with a liner 4, which is a tarp-like material that helps prevent seepage of water into the ground.

Open-air ponds are naturally susceptible to water loss by evaporation. The rate of evaporation from a given open air pond depends on a host of factors, including: relative humidity of the air, air temperature, wind speed, and water temperature. Relative humidity is defined as the amount of water vapor present in air expressed as a percentage of the amount needed for saturation at the same temperature and pressure. Thus, lower relative humidity values of the air above the water result in higher evaporation rates. Conversely, if relative humidity is 100%, then the evaporation rate may effectively be about zero because the air is saturated with water vapor. The amount of water vapor in the air needed for saturation increases with increasing air temperature. Accordingly, the evaporation rate increases with air temperature. Higher wind speed results in higher evaporation rate from the open air ponds because the relative humidity in a volume of air that is immediately above and in contact with a water resource, in the absence of wind or convective air movement, is elevated and wind or convection circulates the air of higher relative humidity and displaces it with air of lower relative humidity.

Both oil and water are produced from a given oil well. The oil and water are separated, leaving substantial quantities of "produced water" that is conventionally disposed or remediated. The produced water is typically referred to as "brine" owing to elevated salinity levels and contains dissolved minerals and organic chemical species. The produced water is a by-product of oilfield operations and is generally not directly usable without remediation. Disposal of the produced water typically involves injecting the water back underground using a disposal well. In some situations, the produced water is subjected to evaporation to concentrate the brine, and to reduce the volume of liquid needed to be injected underground. In other scenarios, the produced water, or a portion of it, is treated and stored in open-air ponds for reuse within the oilfield.

In view of the foregoing, there remains a desire to minimize loss of valuable water resources from water holding ponds that are employed in oilfield operations. Furthermore, there remains a desire to repurpose or employ produced water from oilfield operations for value added applications. Furthermore, other desirable features and characteristics of the present disclosure will become apparent from the subsequent detailed description and the appended claims, taken in conjunction with the accompanying drawings and this background.

BRIEF SUMMARY

Oilfield water resource systems and methods for managing oilfield water resources are provided herein. In an embodiment, an oilfield water resource system includes a water storage pond and a second holding pond. The water storage pond includes an oilfield water resource to be provided for use in an oilfield operation. The second holding pond includes low value water different from the oilfield water resource in the water storage pond. The second holding pond is configured to influence relative humidity of air above a water surface of the oilfield water resource in the water storage pond.

In another embodiment, a method for managing oilfield water resources includes providing a water storage pond comprising an oilfield water resource for use in an oilfield operation. A second holding pond is formed adjacent to the water storage pond, wherein the second holding pond includes low value water different from the oilfield water resource in the water storage pond. The second holding pond is configured to influence relative humidity of air above a water surface of the oilfield water resource in the water storage pond. The oilfield water resource from the water storage pond is employed in an oilfield operation.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
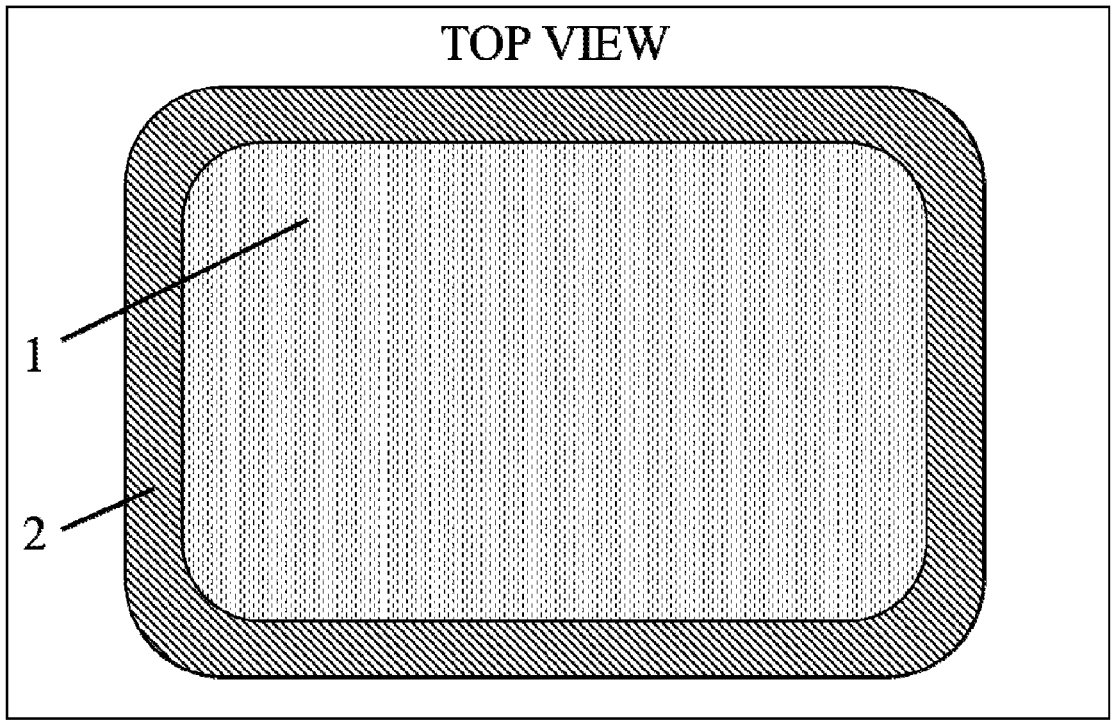
FIG. 1 is a schematic diagram illustrating an oilfield water storage pond.
Figure 2:
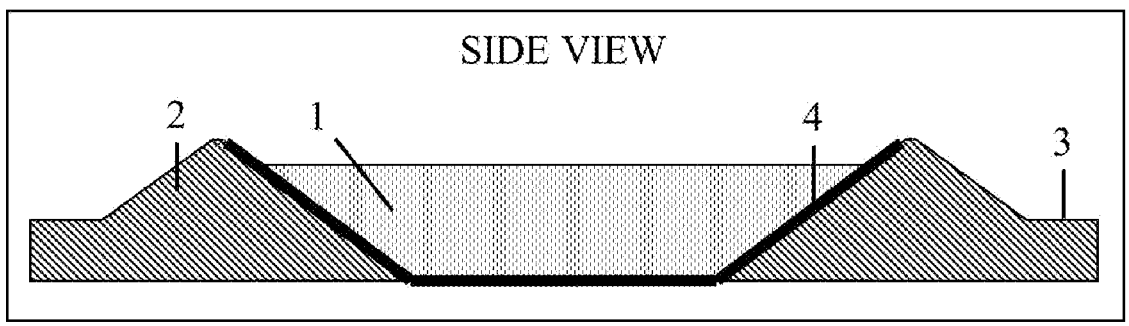
FIG. 2 is a schematic diagram illustrating an oilfield water storage pond.

The following detailed description is merely exemplary in nature and is not intended to limit the oilfield water storage systems and methods as described herein. Furthermore, there is no intention to be bound by any theory presented in the preceding background or the following detailed description. The description is not in any way meant to limit the scope of any present or subsequent related claims.

As used here, the terms "above" and "below"; "up" and "down"; "upper" and "lower"; "upwardly" and "downwardly"; and other like terms indicating relative positions above or below a given point or element are used in this description to more clearly describe some embodiments. However, when applied to equipment and methods for use in wells that are deviated or horizontal, such terms may refer to a left to right, right to left, or diagonal relationship as appropriate.

Provided herein are systems and methods for managing oilfield water resources to minimize evaporation of the valuable water resources. In embodiments, evaporation of the valuable water resources is reduced while also reducing the amount of produced water to be disposed or remediated. Oilfield water resources, as referred to herein, are water sources that are provided for use in an oilfield operation, e.g., water to be introduced into a well for hydraulic fracturing. Produced water, as referred to herein, is any water that is recovered after use of the oilfield water resources during oilfield operations, or water that is separated from oil (and that may originate from natural stores) during oilfield operations. One example of a valuable oilfield water resource is freshwater and/or brackish water that has been procured and stored in a water storage pond, e.g., through purchase or accumulation. Another valuable water resource is remediated produced water that has been treated and cleaned for reuse within the oilfield. It is to be appreciated that produced water is different from remediated produced water, for purposes of the present application, in that remediated produced water is produced from a remediation operation that removes at least some impurities from the produced water whereas the produced water is untreated water recovered during oilfield operations. Owing to the large volumes of water consumed in the oilfield, many times the most cost-effective manner for storing these resources is by employing open-air ponds. Loss of water resources to evaporation is a general concern because such water loss increases costs of oilfield operations. In certain geographical regions, high evaporation rates driven by very low relative humidity and excessively high temperature may even call for the costly storage of water in large enclosed tanks.

As described previously, relative humidity of the air above a water surface influences the rate of water evaporation. It follows that maintaining elevated relative humidity levels above the water surface can reduce the evaporation rate. Produced water is in abundance within the oilfield and can be used as a water vapor source to increase the relative humidity in a volume of air that is above, in contact with, and/or proximate to a given valuable water resource.

Various embodiments of oilfield water resource systems and methods for managing oilfield water resources are contemplated herein. In embodiments, a water storage pond 1 that includes the oilfield water resource is provided. A second holding pond 5 is provided that includes low value water different from the oilfield water resource in water storage pond 1. The second holding pond 5 is configured to influence relative humidity of air above a water surface of the oilfield water resource in the water storage pond 1. More particularly, the second holding pond 5 is configured to humidify a volume of air that is above and/or in contact with the water storage pond 1 that includes the oilfield water resource, which is a valuable water resource (i.e., non-produced water that has yet to be introduced into a well). As referred to herein, the second holding pond 5 influences relative humidity of air above a water surface of the oilfield water resource in the water storage pond 1 if a difference in relative humidity at a height of 1 meters substantially directly above an edge of the water storage pond 1 is at least 3% greater, such as at least 5% greater by influence of the second holding pond 5 as compared to a similarly situated water storage pond 1 in the absence of the second holding pond 5 as measured using a Hygrometer PCE-VDL 161 commercially available from PCE Instruments. For example, if relative humid of 10% is measured at 1 meter above an edge of a water storage pond 1 in the absence of the second holding pond 5, the second holding pond 5 would influence relative humidity by at least 3% relative humidity to instead provide a relative humidity of at least 13%.

In embodiments, the low value water in the second holding pond 5 is provided from a different source than the oilfield water resource in the water storage pond 1 and has a different composition therefrom. In embodiments, the low value water in the second holding pond 5 is of lesser value than the oilfield water resource in the water storage pond 1. For example, the low value water may be produced water. Alternatively, the low value water may be seawater.

Figure 3:
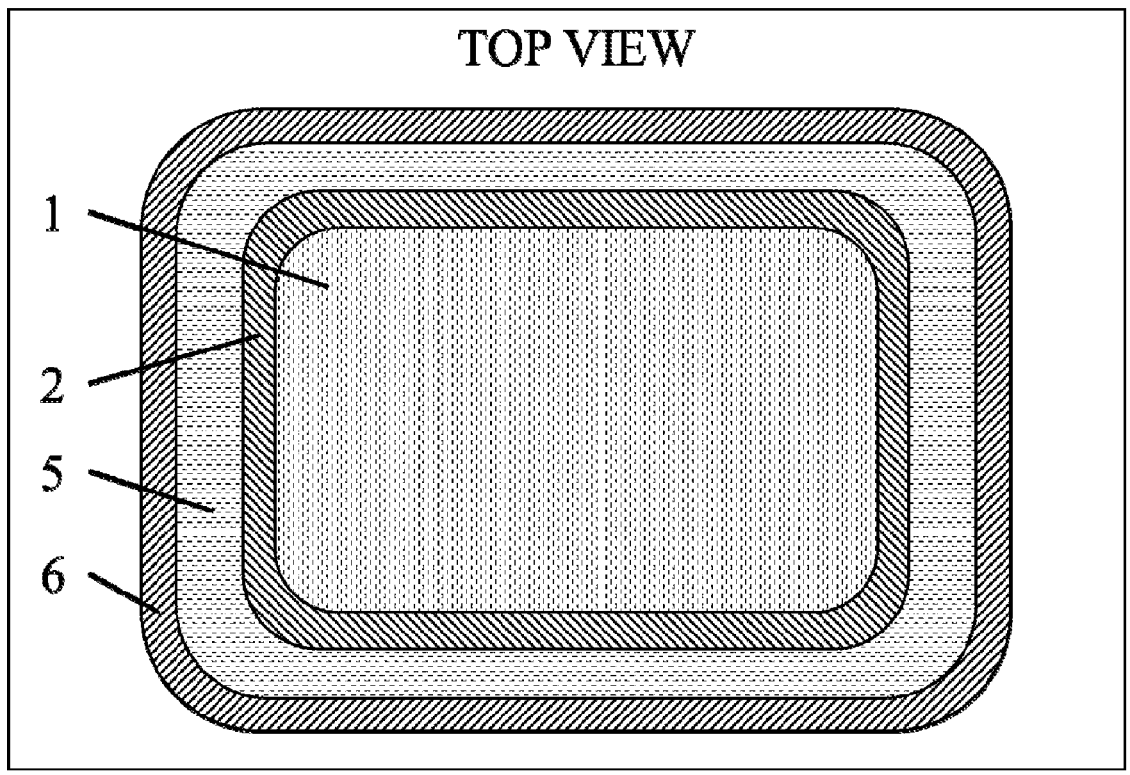
FIG. 3 is a schematic diagram illustrating an oilfield water storage system.
Figure 4:
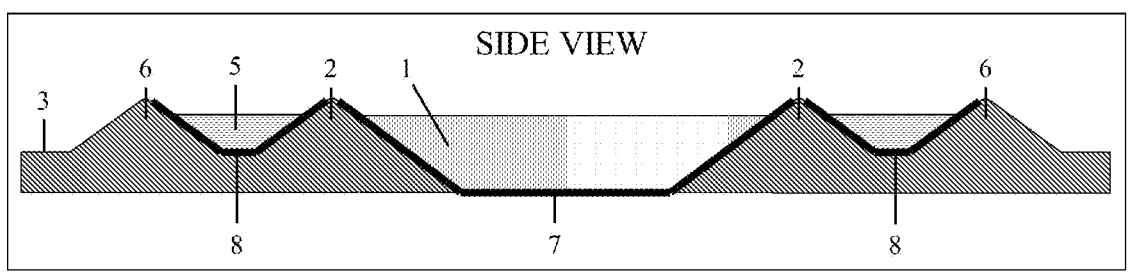
FIG. 4 is a schematic diagram illustrating an oilfield water storage system.
Figure 5:
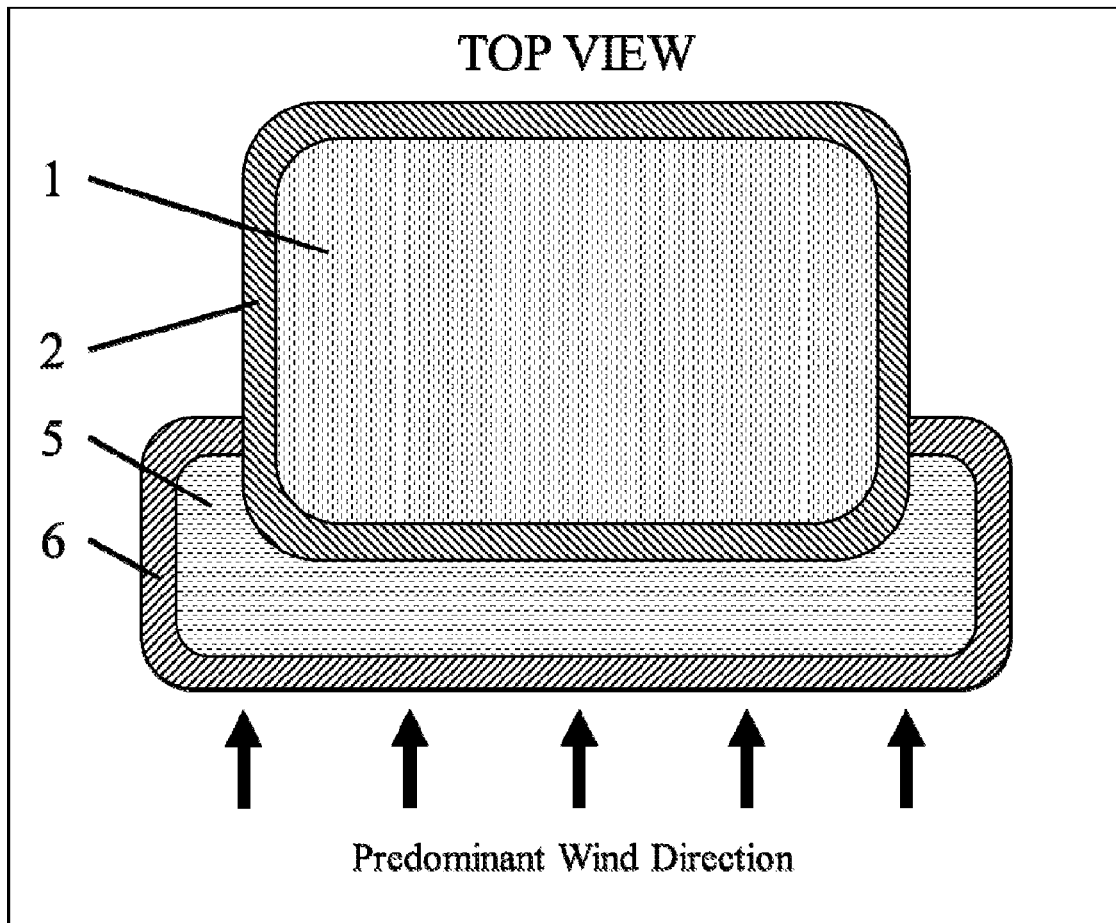
FIG. 5 is a schematic diagram illustrating an oilfield water storage system.
Figure 6:
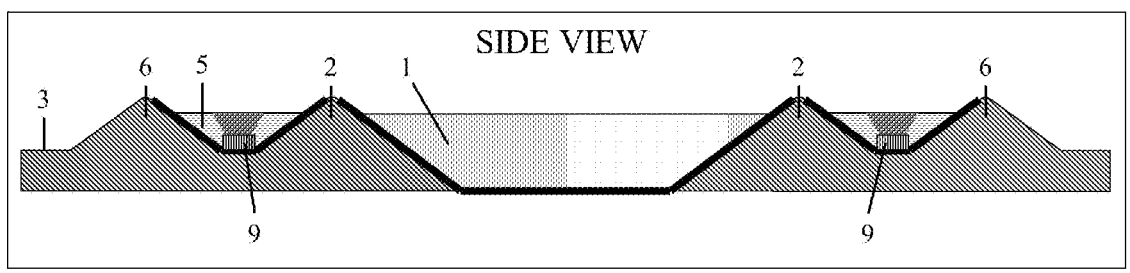
FIG. 6 is a schematic diagram illustrating an oilfield water storage system.

As set forth above, the second holding pond 5 is configured to influence the relative humidity of air above the water storage pond 1. Various configurations are possible to enable the second holding pond 5 to influence the relative humidity in the air above the water storage pond 1. FIGS. 3 and 4 illustrate one embodiment of a suitable configuration, and FIGS. 5 and 6 illustrate another embodiment of a suitable configuration, although it is to be appreciated that various configurations are possible that enable the second holding pond 5 to influence the relative humidity of the air above the water storage pond 1. In embodiments and as shown in FIGS. 3-6, the water storage pond 1 and the second holding pond 5 share a common containment wall or berm 2, which enables the second holding pond to be located as close as possible to the water storage pond 1 while maintaining separation between the two ponds 1, 5. In embodiments and as shown in FIGS. 3-6, the second holding pond 5 extends along at least one side of the water storage pond 1 in an incoming direction of prevailing winds across the water storage pond. More particularly, FIG. 5 illustrates positioning of the second holding pond 5 in such a manner, which has the effect of humidifying circulating air from the incoming airflow that may have lower relative humidity than air being circulated out. In embodiments, the second holding pond 5 at least partially surrounds the water storage pond 1, and the second holding pond 5 may completely surround the water storage pond 1 on all sides thereof. For example, in an embodiment and as shown in FIGS. 3 and 4, an oilfield water resource system is shown that includes a water storage pond 1 and a second holding pond 5 whereby the water storage pond 1 is encircled by the second holding pond 5. The water storage pond 1 contains the valuable oilfield water resource surrounded by an inner berm 2, while the outer, second holding pond 5 contains low value water (e.g., produced water or seawater) surrounded by an outer berm 6. The relative humidity of air above a given water surface is higher compared to the surrounding air. Wet air has a lower density than dry air owing to the molecular weight of water (18 grams per mole) being lower than diatomic oxygen (32 grams per mole) and diatomic nitrogen (28 grams per mole) which are the gases predominately present in air. Thus, in the absence of wind, the moist air above a water resource creates a convection cycle where the moist air rises allowing the inrush of dry air to the water surface. In the presence of wind, the moist air may be dispersed and dry air may be driven toward the water surface from a given direction. Encircling the valuable water resource in the water storage pond 1 by low value water 5 in the second holding pond 2 effectively elevates the water content in the air that surrounds the valuable oilfield water resource in the water storage pond 1 while effectively creating a buffer zone to blunt the impact of convection and/or wind on circulation of lower relative humidity air above and/or in contact with the valuable water resource in the water storage pond 1. It follows that evaporation from the valuable water resource 1 may be lowered because the relative humidity of the air in its proximity is already higher and because the effective buffer created by the air volume over the low value water in the second holding pond 5 hinders circulation of lower relative humidity air above and/or in contact with the valuable oilfield water resource in the water storage pond 1.

Referring back to FIGS. 5 and 6, FIG. 5 illustrates another embodiment that can be utilized in regions where the wind conditions have a prevailing direction. Instead of encircling the valuable water resource in the water storage pond 1 with low value water in the second holding pond 5, the second holding pond 5 is located upwind relative to the water storage pond 1. In this way the system is optimized by configuring the relative position of the second holding pond 5 that contains the low value water and the valuable water resource in the water storage pond 1 based on the prevailing wind direction.

In another contemplated embodiment, the second holding pond 5 is configured to have a higher evaporation rate of low value water therefrom as compared to evaporation rate of the oilfield water resource from the water storage pond 1. For example, the second holding pond 5 may be configured to have a higher surface area to volume ratio as compared to the water storage pond 1. In an embodiment and as shown in FIG. 4, the second holding pond 5 including the low value water is shallower than the water storage pond 1 including the valuable water resource, thereby resulting in the second holding pond 5 having a higher surface area to volume ratio compared to the water storage pond 1. The water depth influences the volume of water present and also correlates to water surface area relative to volume in the given region. Solar heating of a smaller volume of water over a maximized surface area of the region will result in higher water temperatures. As discussed previously, evaporation rate increases with increasing water temperature, so by this methodology the region including the low-value water 5 may be heated to a higher temperature than the region including the valuable water resource 1, thereby contributing a higher proportion of water from the region including the low-value water resource 5 to increase relative humidity in the volume of air above and/or in contact with the region of the valuable water resource 1.

As another example, evaporation rate of the low value water in the second holding pond 5 may be accelerated to generate higher relative humidity of the air above and/or in contact with the valuable water resource 1. For example, the rate of solar heating can also be influenced by radiative heating dynamics, such as by selection of appropriate liner colors placed along the floor of a given water storage region to either promote or hinder evaporation. FIG. 4 illustrates the use of separate liners 7 and 8 located in the two different water storage regions 1 and 5. Liner 8 is located in the second holding pond 5 containing the low value water resource and is selected to have less reflectance, e.g. darker in color, so that it absorbs more infrared radiation to provide more heat to the water. Liner 7 is located in the water storage pond 1 containing the valuable water resource 1 and is selected to be more reflective, e.g. lighter in color, so that more infrared radiation is reflected to minimize solar heating. In this way, the water temperature of the low value water in the second holding pond 5 is further elevated to accelerate evaporation.

Another embodiment is shown in FIG. 6 that contemplates positioning an evaporative device 9, such as a bubbler or a heater, in the second holding pond. For example, an aeration bubble system 9 employed within the region of the low value water containing in the second holding pond 5 may be employed to increase evaporation rate. Air bubblers increase evaporation because each individual bubble may effectively become saturated with water vapor, or at least experiences an increase in relative humidity, as it traverses upward through the water. The air that is pumped through the bubbler system 9 can either be the ambient surrounding air or heated or dehumidified dryer air. The use of dehumidified air may maximize the ability of the bubbles to accelerate evaporation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It being understood that various changes may be made in the function and arrangement of elements described in an exemplary embodiment without departing from the scope of the present disclosure as set forth in the appended claims.

What is claimed is:

1. An oilfield water resource system comprising:
   a water storage pond comprising an oilfield water resource to be provided for use in an oilfield operation;
   a second holding pond comprising water different from the oilfield water resource in the water storage pond, wherein the second holding pond is configured to influence relative humidity of air above a water surface of the oilfield water resource in the water storage pond; wherein the second holding pond is configured to have a higher evaporation rate of water therefrom as compared to evaporation rate of the oilfield water resource from the water storage pond, and wherein the second holding pond is configured to have a higher surface area to volume ratio as compared to the water storage pond.

2. The oilfield water resource system of claim 1, wherein the water in the second holding pond is provided from a different source than the oilfield water resource and has a different composition therefrom.

3. The oilfield water resource system of claim 1, wherein the water in the second holding pond is chosen from produced water or seawater.

4. The oilfield water resource system of claim 1, wherein the water storage pond and the second holding pond share a common containment wall.

5. The oilfield water resource system of claim 1, wherein the second holding pond extends along at least one side of the water storage pond in an incoming direction of prevailing winds across the water storage pond.

6. The oilfield water resource system of claim 1, wherein the second holding pond at least partially surrounds the water storage pond.

7. The oilfield water resource system of claim 6, wherein the second holding pond completely surrounds the water storage pond on all sides thereof.

8. The oilfield water resource system of claim 1, wherein an evaporative device is positioned in the second holding pond.

9. The oilfield water resource system of claim 1, wherein the water storage pond and the second holding pond comprise respective liners, and wherein a liner used in the second holding pond absorbs more infrared radiation than a liner used in the water storage pond.

10. A method for managing oilfield water resources, wherein the method comprises:
    providing a water storage pond comprising an oilfield water resource for use in an oilfield operation;
    forming a second holding pond adjacent to the water storage pond, wherein the second holding pond comprises water different from the oilfield water resource in the water storage pond, wherein the second holding pond is configured to influence relative humidity of air above a water surface of the oilfield water resource in the water storage pond, wherein the second holding pond is configured to have a higher evaporation rate of water therefrom as compared to evaporation rate of the oilfield water resource from the water storage pond, and wherein the second holding pond is configured to have a higher surface area to volume ratio as compared to the water storage pond; and
    employing the oilfield water resource from the water storage pond in an oilfield operation.

11. An oilfield water resource system comprising:
    a water storage pond comprising an oilfield water resource to be provided for use in an oilfield operation;
    a second holding pond comprising water different from the oilfield water resource in the water storage pond, wherein the second holding pond is configured to influence relative humidity of air above a water surface of the oilfield water resource in the water storage pond;
    wherein the second holding pond is configured to have a higher evaporation rate of water therefrom as compared to evaporation rate of the oilfield water resource from the water storage pond, wherein the water storage pond and the second holding pond comprise respective liners, and wherein a liner used in the second holding pond absorbs more infrared radiation than a liner used in the water storage pond.

* * * * *